US009256558B2

(12) United States Patent
Litch et al.

(10) Patent No.: US 9,256,558 B2
(45) Date of Patent: Feb. 9, 2016

(54) DIRECT MEMORY ACCESS DESCRIPTOR-BASED SYNCHRONIZATION

(71) Applicant: SILICON LABORATORIES INC., Austin, TX (US)

(72) Inventors: Timothy E. Litch, Dripping Springs, TX (US); Paul I. Zavalney, Austin, TX (US); Paul Zucker, Austin, TX (US)

(73) Assignee: SILICON LABORATORIES INC., Austin, TX (US)

( * ) Notice: Subject to any disclaimer, the term of this patent is extended or adjusted under 35 U.S.C. 154(b) by 0 days.

(21) Appl. No.: 13/928,487

(22) Filed: Jun. 27, 2013

(65) Prior Publication Data
US 2015/0006765 A1 Jan. 1, 2015

(51) Int. Cl.
*G06F 13/28* (2006.01)
(52) U.S. Cl.
CPC ..................................... *G06F 13/28* (2013.01)

(58) Field of Classification Search
None
See application file for complete search history.

(56) References Cited

U.S. PATENT DOCUMENTS

2011/0191507 A1* 8/2011 Bond et al. ................ 710/23
2011/0314186 A1* 12/2011 Go et al. ................... 710/26

OTHER PUBLICATIONS

U.S. Appl. No. 13/928,506, entitled, "Immediate Direct Memory Access Descriptor-Based Write Operation," filed Jun. 27, 2013, 19 pages.

* cited by examiner

*Primary Examiner* — David E Martinez
(74) *Attorney, Agent, or Firm* — Trop, Pruner & Hu, P.C.

(57) ABSTRACT

A method includes processing descriptors to control a direct memory access (DMA) channel. The method includes synchronizing at least part of the processing, which includes processing a first descriptor of the descriptors to cause the execution to selectively pause based on a trigger value.

16 Claims, 5 Drawing Sheets

DIRECT MEMORY ACCESS DESCRIPTOR-BASED SYNCHRONIZATION

CROSS REFERENCE TO RELATED APPLICATIONS

This application is related to U.S. patent application Ser No. 13/928,506, entitled, "IMMEDIATE DIRECT MEMORY ACCESS DESCRIPTOR-BASED WRITE OPERATION," which was filed on Jun. 27, 2013.

BACKGROUND

One way to communicate data between a system memory and a peripheral component of a computer system is for a central processing unit (CPU) to serve as an intermediary for the communication. For example, to transfer data from the system memory to the peripheral component, the CPU may perform the transfer by initiating the appropriate read operations to retrieve the data from the system memory and initiating the appropriate write operations to store the retrieved data in the memory of the peripheral component. For purposes of reducing CPU overhead, the computer system may employ direct memory access (DMA) in which a DMA engine of the peripheral component directly accesses the system memory to transfer the data. The CPU typically programs the DMA engine to set up the parameters for the transfer, such as the source and destination addresses and the number of bytes to transfer.

SUMMARY

In an example embodiment, a method includes processing descriptors to control a direct memory access (DMA) channel. The method includes synchronizing at least part of the processing, which includes processing a first descriptor of the descriptors to cause the processing to selectively pause based on a trigger value.

In another example embodiment, an apparatus includes a DMA engine to process descriptors to control first operations of at least one DMA channel. The apparatus further includes a register to indicate an event timing. The DMA engine is adapted to synchronize a timing of at least one of the first operations to the event timing, which is indicated by the register.

In yet another example embodiment, an apparatus includes an integrated circuit, which includes a DMA controller and a storage device to store a first value. The DMA controller is adapted to process descriptors to control a DMA channel and synchronize at least part of the processing based at least in part on a comparison of the value to a second value.

Advantages and other desired features will become apparent from the following drawings, description and claims.

DETAILED DESCRIPTION

Figure 1:
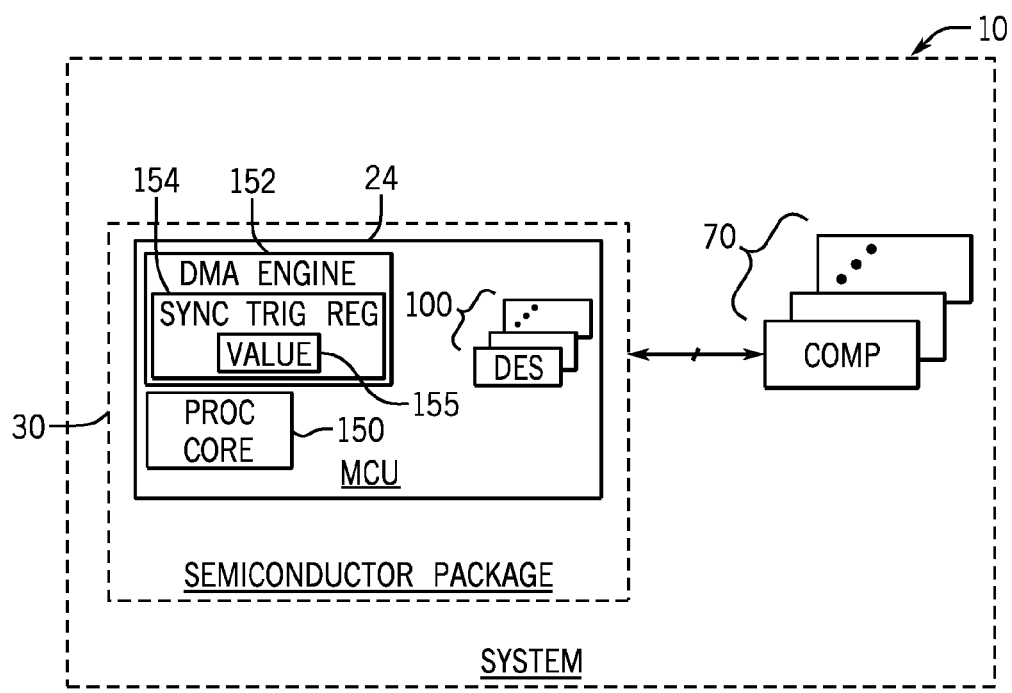
FIG. 1 is a schematic diagram of a microcontroller unit (MCU)-based system according to an example embodiment.

One way to set up a given direct memory access (DMA) transfer (also referred to as a "cycle" herein) is for a central processing unit (CPU) to program registers of a hardware peripheral component's DMA controller, or engine, with the parameters for the transfer, such as the source and target address, the size of the data being transferred and the strides associated with the transfer. Another way to set up a DMA transfer is for the CPU to store the parameters in a memory data structure called a "DMA descriptor."

A DMA descriptor, in general, is a data structure that is processed, or executed, by a DMA engine for purposes of programming parameters into the DMA engine for an associated DMA transfer. A given DMA descriptor may further direct, or link, the DMA engine to the next DMA descriptor to be processed by the DMA engine so that a set of DMA descriptors may be linked together in a "linked list" of DMA descriptors to form a particular DMA descriptor execution flow. A particular advantage of DMA descriptors, as compared to register programming, is that multiple, linked DMA descriptors may be set up in memory to form a linked list to program a corresponding sequence of DMA transfers.

Techniques and systems are disclosed herein that use a DMA descriptor of a linked list of DMA descriptors to synchronize execution of the linked list to a triggering event. The source of the triggering event may be a certain DMA descriptor of a linked list of DMA descriptors for another DMA channel, thereby providing a DMA descriptor-based mechanism to synchronize two DMA channels. As further disclosed herein, non-DMA descriptor-based sources may generate the triggering event, such as, for example, a peripheral device.

As a more specific example embodiment, a given DMA descriptor of a linked list of DMA descriptors may contain a synchronization structure, which, when executed by the DMA engine, causes the DMA engine to pause, or temporarily halt, further execution of DMA descriptors for the linked list until a certain triggering event occurs. The linked list of DMA descriptors may be used, for example, to transfer data from a queue, or buffer; and the triggering event may indicate that the data has been communicated into the buffer and is ready to be transferred. The DMA descriptor-based synchronization may be used for other applications in accordance with other embodiments.

As further disclosed herein, the triggering event may be communicated using the contents of a register (called a "synchronization trigger register" herein) of the DMA engine in accordance with an example embodiment. In this manner, when executing a synchronization structure for a given linked list of DMA descriptors, the DMA engine may pause further execution of DMA descriptors for the linked list until a value that is stored by the synchronization trigger register is the same as a match value that is specified by the synchronization structure. When a match occurs (i.e., when an entity changes the value stored in the synchronization trigger register to coincide with the match value), the DMA engine resumes executing the DMA descriptors of the linked list.

As a more specific example, FIG. 1 depicts an MCU 24 in an example system 10. For this example, the MCU 24 controls various aspects of one or multiple components 70 in response to communications with the component(s) 70. As examples, the components 70 may include one of more of the following depending on the particular application: an electrical motor, a household appliance, an inventory control terminal, a computer, a tablet, a smart power meter, a flow sensor, a wireless interface, a cellular interface, an interactive touch screen user interface and so forth. All or part of the components of the MCU 24 may be part of a semiconductor package 30.

As depicted in FIG. 1, the MCU 24, in accordance with example embodiments, includes a hardware-based DMA controller, or DMA engine 152, which may be part of a peripheral component (a network interface, a wireless interface, a general purpose input/output (GPIO) interface, and so forth) of the MCU 24. The DMA engine 152 executes DMA descriptors for purposes of setting up, initiating and controlling corresponding DMA transfers within the MCU 24. A given DMA transfer may be, as examples, a transfer from a memory of the peripheral component containing the DMA engine 152 to a system memory of the MCU 24; a transfer from the system memory to the memory of the peripheral component; a transfer between system memory locations; or a peripheral-to-peripheral transfer. As shown in the example embodiment of FIG. 1, the DMA engine 152 includes a synchronization trigger register 154, which stores a value 155, which may compared with a match value for purposes of synchronizing DMA channel execution, as further described herein.

Figure 2:
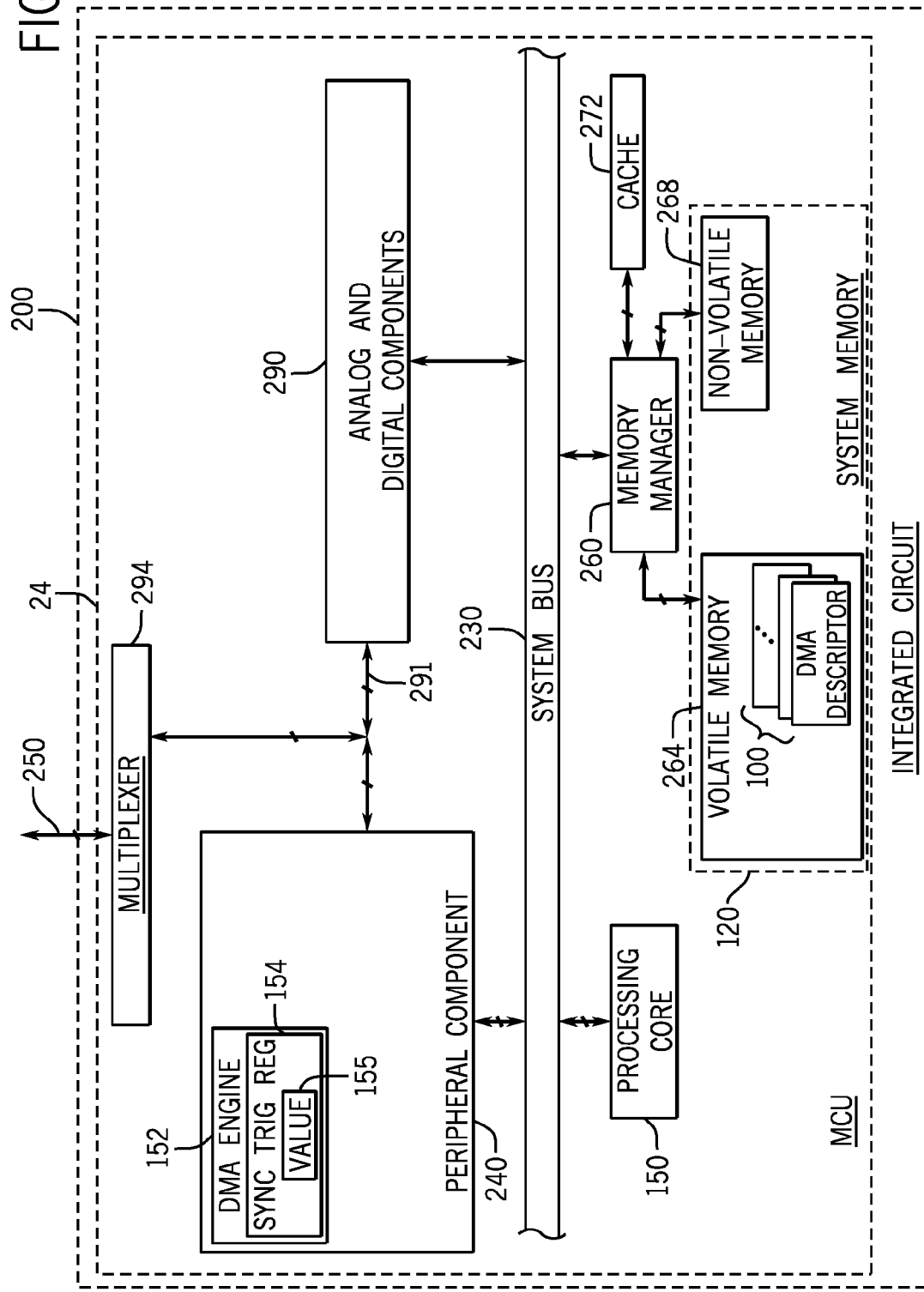
FIG. 2 is a schematic diagram of an MCU of the system of FIG. 1 according to an example embodiment.

Referring to FIG. 2, in accordance with some embodiments, all or part of the components of the MCU 24 may be part of an integrated circuit (IC) 200. As examples, all or part of the components of the MCU 24 may be fabricated on a single die or on multiple dies of the IC 200; and the IC may be packaged to the semiconductor package 30 (see FIG. 1).

Among its components, the MCU 24 includes a processing core 150 and an exemplary peripheral component 240, which contains the DMA engine 152. Depending on the particular embodiment, the MCU 24 may not contain any of the components depicted in FIG. 2 other than the processing core 150 and peripheral component 240; may contain one or more of the components that are depicted in FIG. 2 in addition to the processing core 150 and the peripheral component 240; may contain other and/or additional components than the components that are depicted in FIG. 2; and so forth. Thus, many embodiments are contemplated, which are within the scope of the appended claims.

As an example, the processing core 150 may be a 32-bit core, such as the Advanced RISC Machine (ARM) processing core, which executes a Reduced Instruction Set Computer (RISC) instruction set. In general, the processing core 150 communicates with various other system components of the MCU 24, such as a memory controller, or manager 260, over a system bus 230. In general, the memory manager 260 controls access to various memory components of the MCU 24, such as a cache 272, and components that form a system memory 120 of the MCU 24, such as components that form a non-volatile memory 268 (a Flash memory, for example) and a volatile memory 264 (a static random access memory (SRAM), for example).

It is noted that FIG. 2 depicts a block diagram representation of the MCU architecture, as the MCU 24 may have many other components, bridges, buses, and so forth, in accordance with other exemplary embodiments. For example, in accordance with some embodiments, the MCU 24 may have a bus matrix module that implements slave side arbitration and is used to regulate access to the memory devices of the MCU 24.

In accordance with some embodiments, the MCU 24 includes analog and digital components 290, which communicate analog and digital signals with I/O terminals 290. The analog components may include various components that receive analog signals, such as analog-to-digital converters (ADCs) and comparators; and the MCU 24 may contain analog components that provide analog signals, such as current drivers.

The digital components of the MCU 24 may communicate with the processing core 150 over the system bus 230. As examples, the digital components may include a Universal Serial Bus (USB) interface, a universal asynchronous receiver/transmitter (UART), a system management bus interface (SMB), a serial peripheral interface (SPI), and so forth. In general, these digital components communicate with devices that are external to the MCU 24 via I/O terminals 291. In accordance with example embodiments, the MCU 24 includes a multiplexer 294 for purposes of programmably assigning terminals of the analog and digital components 290 to the I/O terminals 250 of the MCU 24.

As depicted in FIG. 2, in accordance with some embodiments, pending DMA descriptors 100 may be stored in the volatile memory 264. In accordance with example embodiments, the DMA engine 152 may transfer one or more of these pending DMA descriptors 100 into a memory of the DMA engine 152 for execution. It is noted that the DMA engine 152 may retrieve the DMA descriptors 100 from the volatile memory 264, although the processing core 150 may retrieve the DMA descriptors 100 from the volatile memory 264 and store the DMA descriptors 100 in the DMA engine's memory, in accordance with further embodiments. In accordance with further embodiments, the pending DMA descriptors 100 may be stored in non-volatile memory, such as the non-volatile memory 268, for example.

Figure 3:
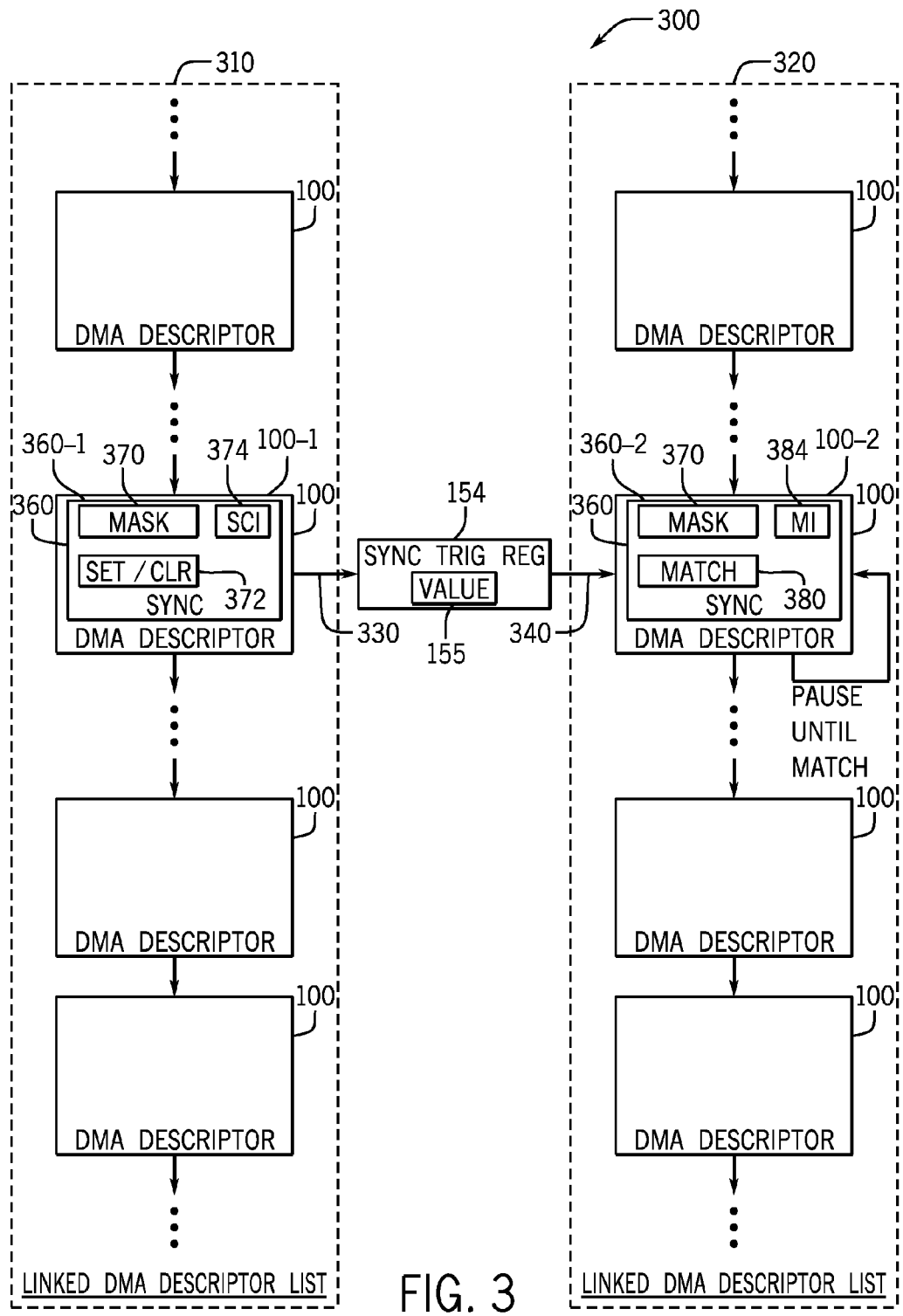
FIG. 3 is an illustration of DMA descriptor-based inter-channel synchronization according to an example embodiment.

FIG. 3 depicts an illustration 300 of DMA descriptor-based inter-channel synchronization according to an example embodiment. For this example embodiment, the DMA engine 152 (FIG. 2) executes a first linked list 310 of DMA descriptors 100 that are associated with a first DMA channel and a second linked list 320 of DMA descriptors 100 that are associated with a second DMA channel. Moreover, for this example embodiment, the linked list 310 is used to selectively gate execution of the DMA descriptors 100 of the linked list 320. As a more specific example, the linked list 310 may be associated with a serial port DMA channel, which is used to transfer data associated with data packets (a channel used by an SPI bus interface, for example). The link list 320 may be associated with, for example, a DMA channel that is used by an Advanced Encryption System (AES) coprocessor (not shown) of the MCU 24, whose operation may be paused until a certain quantity of data has been received from the serial port interface and is available for cryptographic processing by the AES coprocessor.

In accordance with an example embodiment, the DMA engine 152 executes the DMA descriptors 100 of the linked list 320 until the DMA engine 152 encounters a DMA descriptor 100-2, which contains a synchronization structure 360-2 (synchronization structures 360-1 and 360-2 being depicted in FIG. 3 for respective linked lists 310 and 320 as being examples of a synchronization structure 360). The synchronization structure 360-2 of the DMA descriptor 100-2 is a "wait until match" synchronization structure 360, which pauses further execution of the linked list 320 until a triggering event that is specified by the structure 360 is satisfied. In this manner, in accordance with example embodiments, the synchronization structure 360-2 contains a match field 380, which identifies a "match value" to be matched by the value 155 of the synchronization trigger register 154 before further DMA descriptor execution proceeds for the linked list 320. Thus, as depicted in FIG. 3, the DMA engine 152 does not process the next DMA descriptor 100-3 of the linked list 320 until a match occurs.

For this example embodiment, the match occurs when the execution of a given DMA descriptor 100-1 of the linked list 310 by the DMA engine 152 causes the engine 152 to update 330 the value 155 of the synchronization trigger register 154 to the expected match value that is specified by the synchronization structure 360-2. For example, the DMA engine 152 may process the DMA descriptor 100-1 at the conclusion of an operation to transfer a data into a queue to allow the DMA engine 152 to begin processing DMA descriptors 100 of the linked list 320, which are associated with processing the data contained in the queue.

For purposes of updating the value 155 that is stored in the synchronization trigger register 154, the DMA descriptor 100-1 of the linked list 310 contains the depicted synchronization structure 360-1, which is an "update match value" synchronization structure 360. In this manner, the synchronization structure 360-1 for the depicted example embodiment has a set/clear field 372, which identifies bits of the synchronization trigger register 154 to be selectively set and cleared for purposes of changing the value 155 to indicate the match value.

In accordance with an example embodiment, the value 155, which is used to identify a match, may not formed from the full bit width of the synchronization trigger register 154. Instead, depending on the particular example embodiment, one, two, three, four bits (and so forth) or any number of bits of the synchronization trigger register 154 may be used to form the value 155. Moreover, the value 155 may be formed from bits of the register 154, which are associated with consecutive bit positions or bits of the register 154, which are associated with non-consecutive bit positions.

For purposes of indicating which bits of the register 154 are to be altered (via execution of the DMA descriptor 100-1) or read as the match value (via execution of the DMA descriptor 100-2), in accordance with example embodiments, the synchronization structure 360 identifies a mask value. More specifically, in accordance with an example embodiment, the "update match value" synchronization structure 360-1 has a mask field 370, which identifies bit positions (via logic ones, for example) of the synchronization trigger register 154 which are to be set and/or cleared, as indicated by the value stored in the field 372. The "wait until match" synchronization structure 360-2 may contain a mask field 370, which identifies the bits of the synchronization trigger 154, which are to be read for purposes of identifying a match.

In accordance with an example embodiment, the synchronization structure 360 may contain one or multiple bits, which identify the synchronization structure 360 (as opposed to a normal DMA transfer structure), as well as possibly identify whether the synchronization structure 360 is a "wait until match" synchronization structure (such as synchronization structure 360-2) or an "update match value" synchronization (such as the synchronization structure 360-1). Therefore, as depicted in FIG. 3, the synchronization structure 360-1 has a set/clear indicator 374, to identify the synchronization structure 360-1 as a structure to alter the value 155; whereas the synchronization structure 360-2 has a match indicator 384, to identify the synchronization structure 360-2 as one to pause further DMA descriptor execution until a match occurs.

Figure 4:
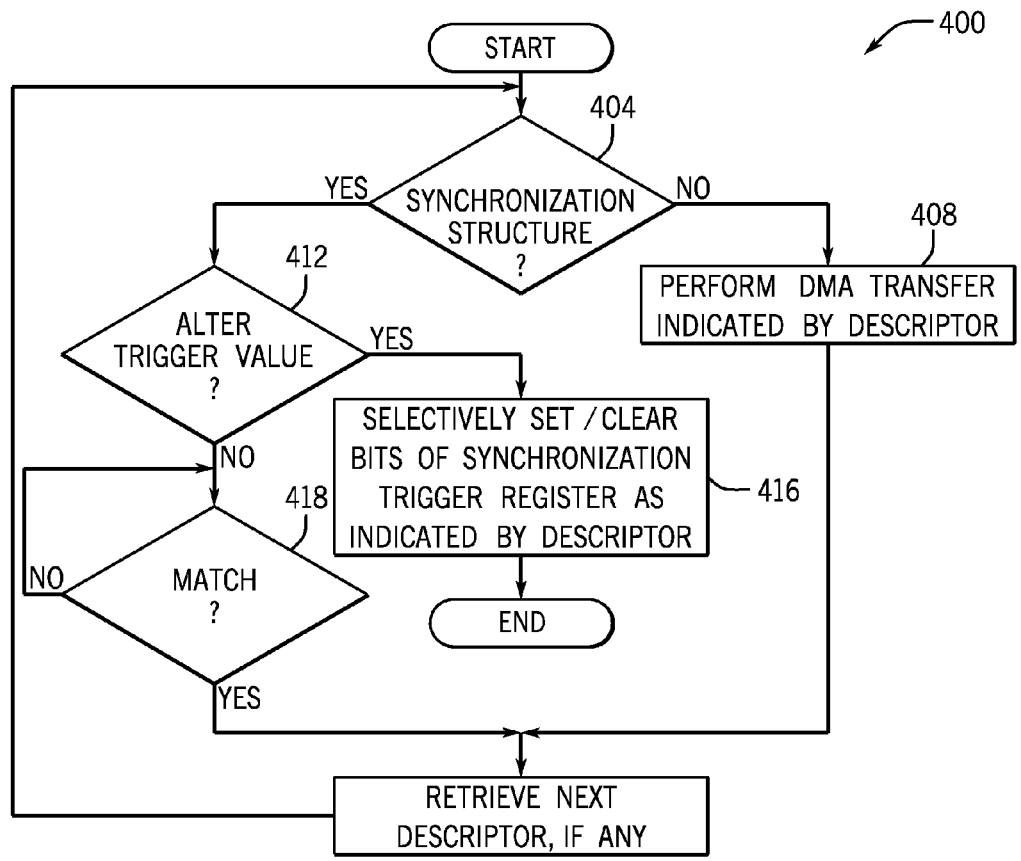
FIG. 4 is a flow diagram depicting a technique to use a DMA descriptor to synchronize execution of a linked list of DMA descriptors according to an example embodiment.

Referring to FIG. 4 in conjunction with FIG. 2, in accordance with an example embodiment, a technique 400 may be performed by the DMA engine 152 for purposes of processing a given DMA descriptor. Pursuant to the technique 400, the DMA engine 152 determines whether the DMA descriptor contains a synchronization structure, pursuant to decision block 404. If not, the DMA engine 152 performs (block 408) the DMA transfer that is indicated by the data contained in the DMA descriptor and retrieves (block 422) the next DMA descriptor, if any.

If the DMA engine 152 determines that the currently-processed DMA descriptor 100 contains a synchronization structure (pursuant to decision block 404), then the DMA engine 152 determines (decision block 412) whether the synchronization structure alters the contents of the synchronization trigger register 155 (i.e., determines whether the synchronization structure is an "update match value" synchronization structure). If so, the DMA engine 152 selectively sets and/or clears the bits of the register 155, as indicated by the DMA descriptor, as indicated by block 416. Otherwise, for this example embodiment, the synchronization structure is a "wait until match" structure; and accordingly, the DMA engine 152 determines (decision block 418) whether a match has occurred. If not, further descriptor execution is paused until a match occurs at which time the next DMA descriptor, if any, is retrieved, pursuant to block 422.

Figure 5:
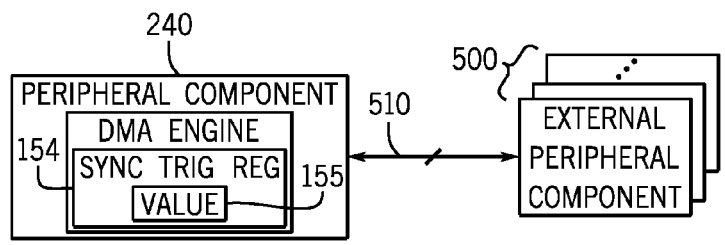
FIG. 5 is an illustration of the use of one or more peripheral components to generate a synchronization triggering event according to an example embodiment.

Other variations are contemplated, which are within the scope of the appended claims. For example, referring to FIG. 5, in accordance with further example implementations, one or more external peripheral components 500 (a programmable timer, for example) may alter the value stored by the synchronization trigger register 155 for purposes of generating a synchronization match. In this regard, the peripheral component 240 (see FIG. 2) of the MCU 24, for example, may communicate via external ports 510 of the peripheral component 204 with one or more external peripheral components 500. These components 500, in turn, may alter one or more bits of the value 155. In this regard, a given match may occur when a single external peripheral component 500 changes the appropriate bit(s) of the value 155, or multiple external peripheral components 500 via the port communication, change multiple bits of the value 155.

Figure 6:
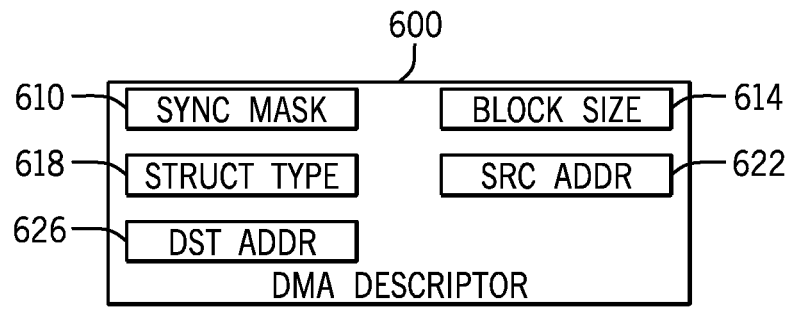
FIG. 6 is an illustration of a DMA descriptor according to an example embodiment.

Referring to FIG. 6, in accordance with an example embodiment, a DMA descriptor 600 may contain the following fields, which may be used for purposes identifying structure type, and specifying parameters for DMA transfers and DMA channel synchronization. In this regard, certain fields of the DMA descriptor 600 may have multiple uses in accordance with the example embodiments. For example, the DMA descriptor 600 may include a block size field 614, whose bits control the number of unit transfers per arbitration cycle in a normal DMA transfer. In this regard, the bits may be used to balance a DMA channel's load, depending on whether the channel is used for relatively high or low latency requestors. The block size 614 may further indicate, through one or multiple bits, whether the particular DMA descriptor 600 contains a synchronization structure. In this regard, as an example, in accordance with some embodiments, the block size field 614 may be a three bit value, that indicates the size of the unit transfers, with a particular value or values of the block size field indicating when the structure is a synchronization structure.

The example DMA descriptor 600 may further include a structure type field 618, which indicates whether the DMA structure is a synchronization structure to change the value 155 (see FIG. 3, for example) or a synchronization structure to pause DMA descriptor execution until the value 155 matches a value specified by the structure. Moreover, the DMA descriptor 600 may include a source address field 622, which, as its name implies, during a normal DMA transfer, indicates the source address for the DMA transfer. However, for a synchronization structure, the source address field 622 may indicate the bits to be selectively set and cleared. For example, in accordance with example embodiments, for an "update match value" synchronization structure, the lower eight bits of the source address field 622 may be used to indicate the bits of the register 154 that are to be set, and the most significant bits of the source address field 622 may indicate the bits of the register 154 that are to be cleared. Moreover, the bits of the source address field 622 may be logically ANDed with the mask value denoted by a synchronization mask field 610 for purposes of determining which bits to set and clear. In accordance with an example embodiment, the mask value may be used to prevent any of the bits from being changed when a match is to be evaluated.

The DMA descriptor 600 may further include a destination address field 626, which, for a normal DMA transfer, indicates the destination address. However, for a "wait until match" synchronization structure, the destination address field 626 may indicate a match value. Moreover, the destination address field 626 may further indicate a mask value to be applied to the match value. For example, in accordance with an example embodiment, the least significant bits of the destination and address field 626 indicate the match value, and the most significant bits of the destination address field 626 may indicate the corresponding mask value. Other variations are contemplated in other example embodiments, which are within the scope of the appended claims.

Figure 7:
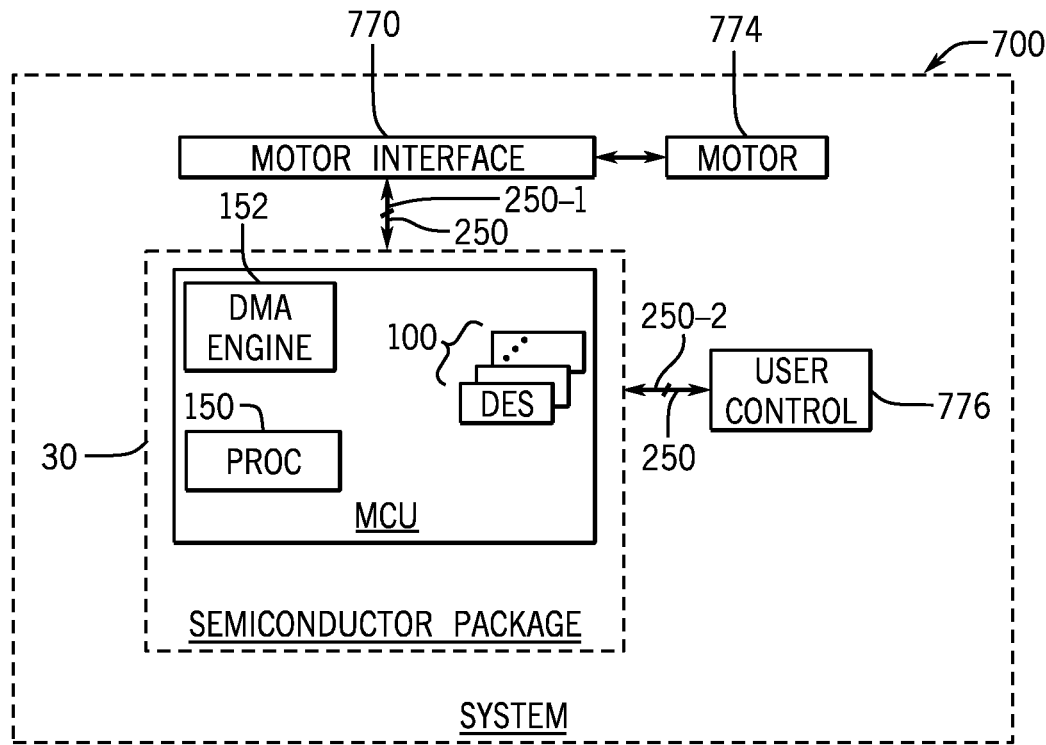
FIG. 7 is a schematic diagram of an MCU-based system according to an example embodiment.

The MCU 24 may be used in one of numerous applications. As an example, referring to FIG. 7, in accordance with some embodiments, the MCU 24 may be part of a system 700 to control a motor 774. In this manner, the MCU 24 may generate/receive input and output signals (I/O signals) in connection with the control of a motor interface 770 that generates and receives signals in connection with operating the motor 774. For example, the MCU 24 may generate signals at I/O terminals 250-1 for purposes of communicating with drivers, sensors, and so forth of the motor interface 770; and in connection with this communication, I/O terminals 250-1 of the MCU 24 may communicate waveforms (pulse width modulation (PWM) signals, for example), receive sensed currents and voltages, communicate data via one or more serial buses, and so forth. The MCU 24 may further include, for example, I/O terminals 250-2 for purposes of generating/receiving signals to communicate with a user control interface 776 for such purposes as communicating status of the motor 774 and motor interface 770; communicating detected fault conditions; receiving user-directed commands and signals; and so forth.

While a limited number of embodiments have been disclosed herein, those skilled in the art, having the benefit of this disclosure, will appreciate numerous modifications and variations therefrom. It is intended that the appended claims cover all such modifications and variations.

What is claimed is:

1. A method comprising:
processing descriptors to control a direct memory access (DMA) channel;
synchronizing at least part of the processing, the synchronizing comprising processing a first descriptor of the descriptors to cause the processing to selectively pause based on a trigger value; and
controlling the trigger value, the controlling comprising processing at least one other descriptor associated with another DMA channel.

2. The method of claim 1, wherein processing the descriptors comprises using a DMA controller to execute the descriptors, and the trigger value comprises a value stored in a register of the DMA controller.

3. The method of claim 1, further comprising:
processing at least one additional descriptor to control another DMA channel; and
using the processing of the at least one additional descriptor to change the trigger value.

4. The method of claim 3, wherein using the processing of the at least one additional descriptor comprises selectively setting and clearing bits of a register storing the trigger value.

5. The method of claim 1, further comprising selectively setting and clearing the bits based at least in part on a mask value indicating candidate bits subject to change.

6. The method of claim 1, communicating with a port of a DMA controller to change the trigger value.

7. The method of claim 1, wherein synchronizing further comprises comparing the trigger value to a value indicated by the first descriptor.

8. The method of claim 7, wherein the comparing comprises comparing the trigger value to the value indicated by the first descriptor for bit positions indicated by a mask value indicated by the first descriptor.

9. An apparatus comprising:
a direct memory access (DMA) engine to process descriptors to control first operations of at least one DMA channel;
a register to indicate an event timing; and
a device other than the DMA engine to store content in the register to control the indication of the event timing,
wherein the DMA engine is adapted to synchronize a timing of at least one of the first operations to the event timing indicated by the register.

10. The apparatus of claim 9, wherein the register is disposed in the DMA engine.

11. The apparatus of claim 9, wherein the descriptors comprise a linked set of descriptors associated with the at least one DMA channel.

12. The apparatus of claim 11, wherein the linked set of descriptors comprise a first descriptor whose execution cause the DMA engine to pause further execution of the linked set of descriptors until a match value indicated by the first descriptor is determined to be a match with a value indicated by the register.

13. The apparatus of claim 9, wherein the register comprises a content adapted to be changed in response to descriptor execution.

14. The apparatus of claim 9, wherein the register comprises a content adapted to be changed in response to communication with at least one port of a DMA controller.

15. The apparatus of claim 9, wherein the device comprises a bus interface.

16. The apparatus of claim 9, further comprising:
an integrated circuit, wherein the DMA engine, the register and the device other than the DMA engine are part of the integrated circuit.

* * * * *